(12) United States Patent
Benavides

(10) Patent No.: US 7,008,605 B1
(45) Date of Patent: Mar. 7, 2006

(54) METHOD FOR MANUFACTURING HIGH QUALITY CARBON NANOTUBES

(75) Inventor: Jeanette M. Benavides, Alexandria, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 559 days.

(21) Appl. No.: 10/292,952

(22) Filed: Nov. 8, 2002

Related U.S. Application Data

(60) Provisional application No. 60/333,606, filed on Nov. 8, 2001.

(51) Int. Cl.
  *D01F 9/12* (2006.01)
(52) U.S. Cl. .................................... 423/447.1
(58) Field of Classification Search ............ 423/447.3, 423/447.1; 977/DIG. 1
  See application file for complete search history.

(56) References Cited

U.S. PATENT DOCUMENTS

| | | | | |
|---|---|---|---|---|
| 4,435,375 A | * | 3/1984 | Tamura et al. ............... | 423/439 |
| 5,482,601 A | * | 1/1996 | Ohshima et al. ............ | 204/173 |
| 5,783,263 A | | 7/1998 | Majetich et al. | |
| 6,149,775 A | | 11/2000 | Tsobol et al. | |
| 6,740,224 B1 | | 5/2004 | Benavides et al. | |

OTHER PUBLICATIONS

Taylor, R. "The Chemistry of Fullerenes" 1995, World Scientific Publishing Co. Ptc. Ltd. Chapter 2 (L. D. Lamb) pp. 20-34.*

* cited by examiner

*Primary Examiner*—Stuart L. Hendrickson
*Assistant Examiner*—Rebecca M. Stadler
(74) *Attorney, Agent, or Firm*—Keith L. Dixon

(57) ABSTRACT

A non-catalytic process for the production of carbon nanotubes includes supplying an electric current to a carbon anode and a carbon cathode which have been securely positioned in the open atmosphere with a gap between them. The electric current creates an electric arc between the carbon anode and the carbon cathode, which causes carbon to be vaporized from the carbon anode and a carbonaceous residue to be deposited on the carbon cathode. Inert gas is pumped into the gap to flush out oxygen, thereby preventing interference with the vaporization of carbon from the anode and preventing oxidation of the carbonaceous residue being deposited on the cathode. The anode and cathode are cooled while electric current is being supplied thereto. When the supply of electric current is terminated, the carbonaceous residue is removed from the cathode and is purified to yield carbon nanotubes.

13 Claims, 1 Drawing Sheet

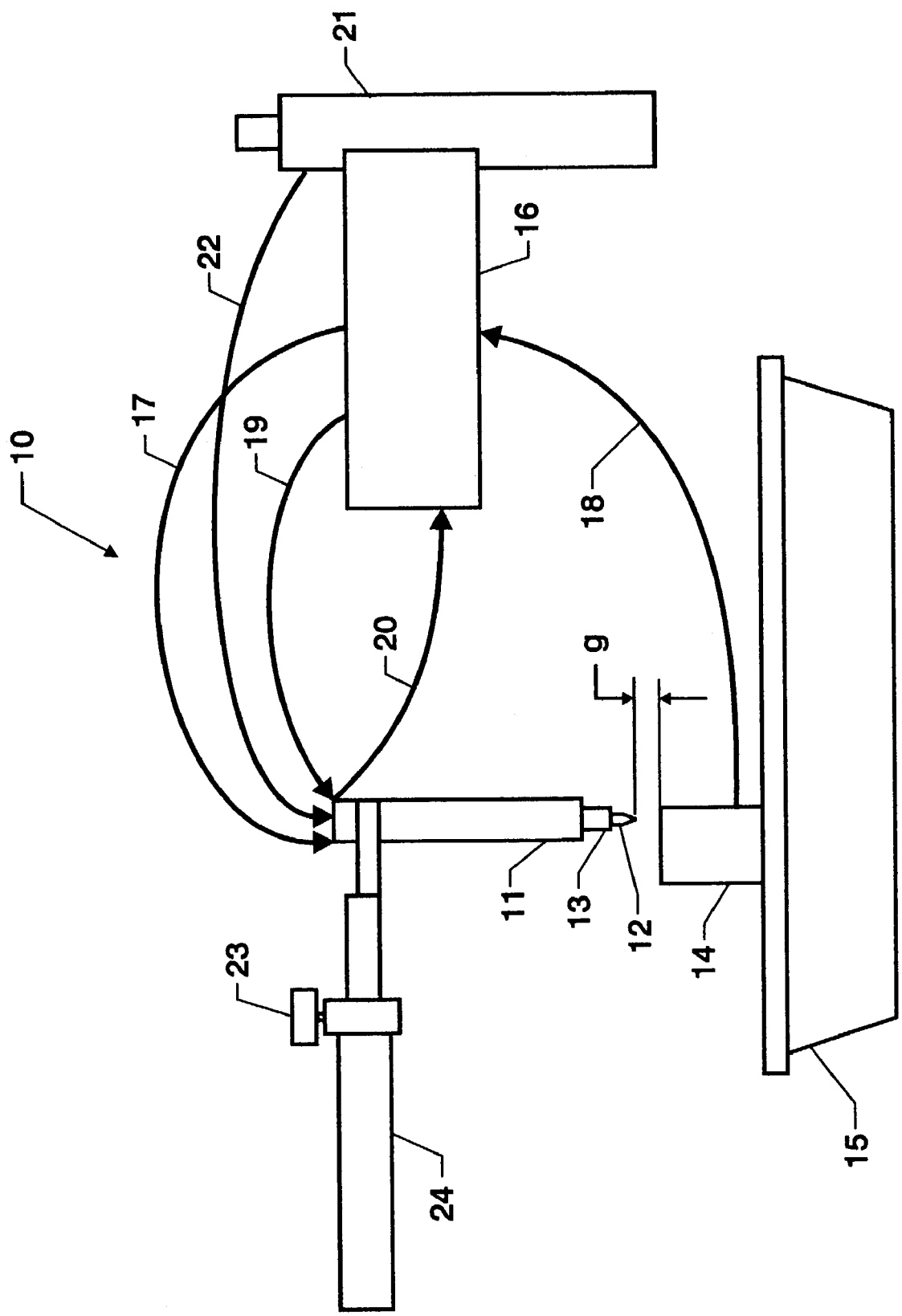

METHOD FOR MANUFACTURING HIGH QUALITY CARBON NANOTUBES

This application claims the benefit of Provisional Application No. 60/333,606, filed Nov. 8, 2001.

The invention described herein was made by an employee of the United States Government, and may be manufactured and used by or for the Government for governmental purposes without the payment of any royalties thereon or therefor.

BACKGROUND OF THE INVENTION

1. Field of the Invention

This invention relates generally to structures made of elemental carbon. It relates particularly to carbon nanotubes, and especially to a method for their production.

2. Description of the Related Art

Carbon nanotubes have drawn significant attention from the technological community with their unusual physical properties and wide range of actual and potential uses. Carbon nanotubes are made of a highly ordered sheet of carbon atoms rolled into a tube. This uniform structure gives the carbon nanotubes their unique properties. They have exceptional mechanical flexibility and strength, with reported tensile strengths of up to 100 GPa. These mechanical properties, along with their chemical stability, have allowed scientists and engineers to use carbon nanotubes as dopants in composites, and as tips for scanning force microscopy. Their nanoscale size and cylindrical shape have led to applications as a storage medium for gases and templates for nanowires. Their exceptional electron emission properties have led to successful use in field emission displays and luminescent tubes, while their electrical conductivity has encouraged their use as electrodes and in microcircuits.

The basic form of a carbon nanotube is a hexagonal network of carbon atoms. This network has been rolled to form a seamless cylinder with both end closed by a half of a fullerene molecule. A fullerene molecule is a closed hollow aromatic carbon compound that is made up of twelve pentagonal faces and differing numbers of hexagonal faces, which act as a cap on the end of the nanotube. Carbon nanotubes are grown in three forms: armchair, zigzag, and chiral.

There are two major groups of carbon nanotubes, viz., single-walled and multi-walled. A single-walled carbon nanotube has only one layer in the carbon lattice. Multi-walled carbon nanotubes are composed of concentric layers of single-walled carbon nanotubes.

When carbon nanotubes are produced, they are highly ordered and are well graphitized, i.e., their carbon lattice has very few imperfections, and they have properties very much like graphite.

Sumio Iijima first published his discovery of carbon nanotubes in 1991. One year before this, researchers in Heidelberg, Germany and Tucson, Ariz. reported a method for making large quantities of the carbon molecules called buckminsterfullerene or $C_{60}$. This research justified the experiments Iijima had been conducting on the atomic-scale structure of carbon for over a decade. In 1991 Iijima experimented with the technique that had enabled the $C_{60}$ researchers to make their new form of carbon. By passing electrical sparks between two closely spaced graphite rods, a process known as arc discharge, Iijima vaporized the rods and allowed the carbon to condense in a soot-like mass. When he looked at the mass through the microscope, Iijima found tiny tubes of pure carbon a few nanometers in diameter amongst the soot. These "nanotubes" were hollow, and had several layers. Roger Bacon had previously used the arc discharge method in the early 1960s to make "thick" carbon whiskers. Carbon nanotubes may be been formed by Bacon's experiments, but he lacked the high powered microscope required to see them. Iijima first saw multi-walled nanotubes; however, less than two years later he observed single-walled carbon nanotubes. The addition of a small amount of transition-metal power (cobalt, nickel or iron) favors the growth of single-walled nanotubes, a fact independently noticed by Donal Bethune and Iijima. A group at Rice University led by Richard Smalley completed the first mass production of carbon nanotubes. By 1993, multi-walled nanotubes had given way to single-walled versions, the properties of which are much easier to predict.

Since their discovery in 1991, carbon nanotubes have been manufactured almost exclusively by catalytic growth methods, which employ various metal catalysts to delay capping of the growing nanotubes, thereby allowing longer tubes to grow, which can be separated into single-walled tubes. Growth methods have included the arc-discharge method, whereby an electric current is created between a graphite anode and a graphite cathode, causing the graphite in the anode to vaporize and be deposited on the cathode in several forms, including carbon nanotubes. Chemical vapor deposition provides another significant growth method. For example, Jung et al. and Lee et al. have employed this method to grow carbon nanotubes by thermally decomposing acetylene in a furnace. As an example, a thin nickel layer is first deposited on an oxidized silicon wafer, and this substrate is then positioned in a horizontal flow reactor wherein it is pretreated by a flow of gases thereover. Acetylene is then added to the environment of gases, and the acetylene is decomposed to form nanotubes on the substrate.

Significant amounts of impurities are inevitable when carbon nanotubes are produced by the catalytic methods of the Related Art. In addition to increasing the cost of nanotube production, the employment of catalysts results in the presence of metal catalyst particles in the nanotube product, and additional purification processes are required for removal of these metal catalyst particles. For example, purification treatments employing acids such as nitric acid (Vaccarini et al.) or hydrofluoric acid (Colomer et al.) have been utilized for this purpose. Both Vaccarini and Colomer have reported, however, that their acid purification procedures have left some additional amorphous carbon from the pores of the metal catalyst particles, and this additional amorphous carbon requires an additional removal procedure.

It is accordingly a primary object of the present invention to obviate disadvantages presented by prior art processes and to provide a simple, inexpensive, energy-efficient method for the manufacture of high quality carbon nanotubes, which method does not employ a catalyst in the growth step of the procedure.

SUMMARY OF THE INVENTION

This primary object, as well as its attending benefits, are achieved, and the disadvantages of prior art processes are obviated by the process of the present invention, which is summarized as follows.

A non-catalytic process for the production of carbon nanotubes is provided, which includes supplying a first carbon rod to serve as an anode and a second carbon rod to serve as a cathode. The anode is preferably composed of amorphous carbon. The carbon anode and the carbon cathode are securely positioned in the open atmosphere so that a gap is provided between them. This gap is preferably between about 0.5 mm and about 1.5 mm.

An electric current is then supplied to the carbon anode and the carbon cathode so that an electric discharge or arc is created in the gap. The electric current is preferably a continuous current of about 19 A at a voltage of about 30V, or a pulsed current of about 28 A at a frequency of between about 4 and 10 Hz. The electric discharge or arc causes carbon to vaporize from the carbon anode and a carbonaceous residue to be deposited on the carbon cathode.

While the electric current is being supplied to create the arc, an inert gas is pumped into the gap to flush out oxygen of the atmosphere from the gap. This prevents oxygen from interfering with the vaporization of carbon from the carbon anode and prevents oxidation of the carbonaceous residue which is being deposited on the carbon cathode. The inert gas is preferably helium, which is advantageously pumped through an annular chamber surrounding the anode and extending along its length, thence into the gap and down upon the surface of the carbon cathode, upon which the carbonaceous residue is being deposited. The helium is preferably pumped at a pressure between about 25 psig and about 60 psig, advantageously at about 50 psig.

While the electric current is being supplied to create the arc, the gap is maintained between about 0.5 mm and about 1.5 mm, and the carbon anode and the carbon cathode are cooled. The carbon anode is preferably cooled by means of a circulating liquid coolant, and the carbon cathode is preferably cooled by immersion thereof in a liquid cooling bath. The cooling bath is advantageously a bath containing ice water, maintaining a temperature of about 0.5° C.; or a bath containing liquid at ambient temperature; or a bath containing dry ice; or a bath containing liquid nitrogen.

When the supply of electric current to the carbon cathode and the carbon anode is terminated, the carbonaceous residue is removed from the cathode and is purified to yield carbon nanotubes.

Purification is accomplished by soaking raw carbonaceous residue in toluene, preferably for between about 5 and about 10 days, to produce a carbonaceous residue/toluene suspension, which is then filtered to produce a filtrate and a solid residue, which is then dried. The toluene dissolves amorphous carbon but not carbon nanotubes. It is advantageous if the dried solid residue is then subjected to a sugar gradient separation to separate the solid residue into a plurality of fractions based on particle weight. Middle fractions are then centrifuged, followed by rinsing with acetone to free them of water. The rinsed fractions are them dried to remove acetone.

BRIEF DESCRIPTION OF THE DRAWING

For a more complete understanding of the present invention, including its primary object and attending benefits, reference should be made to the Detailed Description of the Invention, which is set forth below. This Detailed Description should be read together with the accompanying drawing, wherein: the sole drawing FIGURE is a schematic depicting a preferred embodiment of the process of the present invention.

DETAILED DESCRIPTION OF THE INVENTION

Growth Process

Referring particularly to the sole drawing FIGURE, a preferred process 10 according to the present invention is illustrated schematically with reference to a preferred apparatus which was employed. An amorphous carbon rod was obtained from Ted Pella, Inc. This amorphous carbon rod, which served as the anode, was denominated Grade 1 and was 1/8 inch in diameter and 145 cm. in length. A rod with a diameter of 1/4 inch was also successfully used. It was inserted into anode tube 11 and adjusted therein so that a length 12 of the amorphous carbon rod as exposed at the bottom of anode tube 11. This length 12 was advantageously about 2 cm. Anode tube 11 was configured to enclose an annular chamber terminating in nozzle 13, through which inert gas was pumped, as set forth hereinafter. Anode tube 11 also enclosed a chamber adapted to receive and discharge circulating liquid coolant for cooling the amorphous carbon rod.

A graphite rode 14 was provided to serve as the cathode. It had an outside diameter of about 5.5 cm and a hollow inner core having a diameter of about 1.5 mm. Graphite rod 14 was immersed in cooling bath 15, which contained a liquid, e.g., water, at ambient temperature. Also employed with success were an ice water bath maintaining a temperature of about 0.5° C.; a dry ice bath; and a bath containing liquid nitrogen.

Anode 12 was placed in electrical contact with Miller Synchrowave 350LX CC-AC/DC Squarewave Power Source arc welder 16 by means of lead wire 17. Cathode 14 was placed in electrical contact with arc welder 16 by means of lead wire 18. Arc welder 16 was equipped with a Miller Coolmate 4 system, which was employed to circulate liquid coolant through anode tube 11 by means of conduits 19 and 20. Compressed helium was pumped from cylinder 21 through anode tube 11 by means of conduit 22 at a pressure of about 50 psig. Pressures of 25 psig to 60 psig were also employed with success. The helium was discharged out of nozzle 13 and down upon the exposed upper surface of cathode 14. Arc welder 16 sent a continuous current of about 19 A at a voltage of about 30V through the system, producing an electric arc in gap g, which is the space between the tip of anode 12 and the exposed upper surface of cathode 14. A pulsed electric current of about 28 A was also applied with success at a frequency of about 4 to about 10 Hz. This electric arc caused anode 12 to vaporize and deposit a carbonaceous residue on the upper surface of cathode 14. No catalysts were employed in this process, which was carried out in the open atmosphere. Anode tube height control 23, in association with anode tube support 24, was employed to maintain gap g between about 0.5 mm and about 1.5 mm during the process. If gap g became smaller than about 0.5 mm or larger than about 1.5 mm, the electric arc could not be maintained effectively. One "run", occupied the time that it took to vaporize the exposed approximately 2 cm of anode 12. The carbonaceous residue which had accumulated on the upper surface of cathode 14 was removed and collected for purification and characterization. Analysis of the raw carbonaceous residue by scanning electron microscopy showed that carbon nanotubes were present therein.

Purification

After the raw nanotube-containing carbonaceous residue was produced, it was subjected to a toluene separation process. Toluene dissolves amorphous carbon but not carbon nanotubes, and is much safer and easier to use than other carbonaceous waste removal processes. The carbonaceous residue was suspended in toluene in an Erlenmeyer flask, with a ratio of approximately 0.1 g soot: 0.1 L toluene. It was heated to between 60 and 90° C. and stirred for at least one hour, allowed to soak in the toluene for 5 to 8 days, then filtered through a 3 μm Fluoropore FSLW filter.

The filtrate was collected in a beaker, while the precipitate was scraped off the filter onto a glass watch plate. The filter was cleaned by sonication in toluene for 5 seconds, then pouring the toluene onto the glass watch plate with the precipitate. This sonication process was repeated 3 times. The watch plate with precipitate and toluene was set into a fume hood to dry.

After the carbonaceous residue had undergone the toluene separation, and was dried and weighed, it was separated by particle weight through a sugar gradient separation. The carbonaceous residue was ground with a mortar and pestle, placed in a 10 ml glass beaker with 0.5 ml of detergent (Fisher brand; VersaClean Liquid Concentrate). The beaker was filled the rest of the way with distilled water, and placed in an ultrasonic bath for 5 seconds. After this time, most of the carbonaceous residue was wet and pourable.

Upon removal from the ultrasonic bath, the carbonaceous residue was poured into the top of a separatory funnel. A 40% aqueous sugar solution was poured into the bottom half of the funnel (with the valve closed). A 20% aqueous sugar solution was then poured into the funnel over a glass rod. The 20% solution flowed along the glass rod and then down the inside of the funnel, eventually settling gently on top of the 40% solution. This happened because the 40% solution is denser than the 20% solution. The contents of the funnel were stirred once with the glass rod. This allowed the two solutions to mix slightly, creating a density gradient.

The wetted carbonaceous residue was then poured into the top of the separatory funnel. Immediately afterwards, the bottom of the funnel was opened slightly, allowing the sugar solution to begin to drain out. Distilled water was used to rinse any dry residue that remained in the beaker into the separatory funnel. The larger carbon pieces fell to the bottom of the funnel, while the smaller pieces remained suspended in the sugar solution. Four vials (25 ml each) were filled with the sugar/carbonaceous residue solution as it drained from the separatory funnel. After the liquid was emptied, distilled water was used to rinse any remaining carbonaceous residue out of the funnel and into the last vial.

Because scanning electron microscope analysis showed a higher percentage of exposed nanotubes in the second and third vials than the first or last vial, only the middle vials underwent further cleaning. A small amount (between 0.5 and 1 ml) of 20% aqueous NaCl solution was added to each of the middle vials, to encourage separation of the nanotubes from the water. The NaCl dissolved in the water, making it more polar. This caused the relatively non-polar carbon particles to clump together and separate from solution more easily. The middle vials were centrifuged at approximately 3500 rpm for 10 minutes, after which time the liquid was removed with an automatic pipette. The vials were then filled with fresh distilled water and a smaller amount of NaCl solution and centrifuged again. This process was repeated between 5 and 8 times. The vials were then filled with acetone, instead of distilled water. They were then centrifuged and refilled with acetone 3 to 4 times, removing most of the remaining water. After the last acetone wash was pipetted away, the vials were left open in the lab overnight, allowing any remaining acetone and water to evaporate.

Characterization

The following characterization methods were employed to determine the efficacy of the instant process and to examine effects produced by changing process parameters. Scanning electron microscopy was employed to determine if the separation/purification step was successful, and to observe the length, diameter, and distribution of nanotubes produced. Energy dispersive spectroscopy was utilized to check the nanotube product for contaminants and to provide a reference against which various batches could be compared. Raman spectrographic analysis provide characteristic signals for amorphous carbon, graphite, and carbon nanotubes. Transmission electron microscopy provided an image of the cross-section of a sample at very high magnifications, showing whether the growth process produced single-walled or multi-walled nanotubes. Atomic force microscopy provided a very high resolution image of the surface of the carbon nanotubes at very high magnifications. Thermal gravimetric analysis was employed to first obtain characteristic degradation temperatures of pure graphite and pure amorphous carbon, and then determine what was waste and graphite in samples which were produced, thereby identifying what was carbon nanotubes.

Results

Employing the above identified characterization methods, it was clearly shown that the present process produced carbon nanotubes non-catalytically. Moreover, Raman spectroscopy and transmission electron spectroscopy showed that single-walled carbon nanotubes were produced by this non-catalytic process. This is in sharp contrast to the processes of the Related Art, which produced only multi-walled carbon nanotubes without the aid of a catalyst. Employing preferred embodiments according to the present invention, raw samples with up to a 78% yield of carbon nanotubes were produced at an estimated cost of approximately $10/gram. This is in sharp contrast to the catalytic processes of the Related Art, which produced only moderate yields (30–50% nanotubes) at costs of approximately $100/gram. Accordingly, a simple, inexpensive, energy-efficient method has been presented for the manufacture of high quality carbon nanotubes, which method does not employ a catalyst in the growth step of the procedure.

I claim:

1. A non-catalytic process for the production of carbon nanotubes, which process comprises:

providing a first carbon rod composed of amorphous carbon to serve as a carbon anode and a second carbon rod to serve as a carbon cathode, the first carbon rod and the second carbon rod each having first and second ends;

securely positioning the first carbon rod and the second carbon rod in the open atmosphere so that a gap is maintained between about 0.5 mm and about 1.5 mm while carbon is vaporized from the first end of the first carbon rod and carbonaceous residue is deposited on the first end of the second carbon rod supplying electric current to the first and second carbon rods so that an electric arc is created between the first end of the first carbon rod and the first end of the second carbon rod, thereby vaporizing carbon from the first end of the first carbon rod and depositing a carbonaceous residue on the first end of the second carbon rod;

pumping an inert gas into the gap to flush out oxygen of the open atmosphere from the gap, thereby preventing oxygen from interfering with the vaporizing of the carbon from the first end of the first carbon rod and preventing oxidation of the carbonaceous residue being deposited on the first end of the second carbon rod;

cooling the first and second carbon rods while electric current is being supplied to the first and second rods to create the electric arc;

terminating the supplying of electric current to the first and second carbon rods and removing the carbonaceous residue from the first end of the second carbon rod; and purifying the carbonaceous reside to yield carbon nanotubes.

2. The process of claim 1, wherein a continuous electric current of about 19 A is supplied to the first and second carbon rods at a voltage of about 30V.

3. The process of claim 1, wherein a pulsed electric current of about 28 A is supplied to the first and second carbon rods at a frequency of between about 4 and 10 Hz.

4. The process of claim 1, wherein the inert gas is pumped trough an annual chamber which surrounds the first carbon rod and extends along the length of the first carbon rod, thence through a nozzle and finally into the gap and down upon the first end of the second carbon rod.

5. The process of claim 1, wherein the first carbon rod is cooled by circulating liquid coolant thereover and the second carbon rod is cooled by immersing the second end thereof in liquid in a cooling bath.

6. The process of claim 4, wherein the inert gas is helium.

7. The process of claim 6, wherein the helium is pumped at a pressure of between about 25 psig and about 60 psig.

8. The process of claim 7, the helium is pumped at a pressure of about 50 psig.

9. The process of claim 5, wherein the liquid in the cooling bath is at ambient temperature.

10. The process of claim 5, wherein the cooling bath is a member selected from the group consisting of an ice water bath, dry ice bath, and a liquid nitrogen bath.

11. The process of claim 1, wherein purification of carbon nanotubes from the carbonaceous residue is accomplished by the following procedure:

soaking raw carbonaceous residue in toluene to produce a carbonaceous residue/toluene suspension;

filtering the carbonaceous residue/toluene suspension to produce a solid residue and a filtrate; and drying the solid residue.

12. The process of claim 11, which additionally comprises the steps of:

subjecting dried solid residue to a sugar gradient separation to separate the solid residue into a plurality of fractions based on particle weight;

centrifuging middle fractions and rinsing centrifuged middle fractions with acetone to produce rinsed middle fractions which are free of water; and drying rinsed middle fractions to remove acetone.

13. The process of claim 11, wherein the raw carbonaceous residue is soaked in toluene for between about 5 days and about 10 days.

* * * * *